United States Patent
Park et al.

(10) Patent No.: US 6,967,931 B2
(45) Date of Patent: Nov. 22, 2005

(54) APPARATUS AND METHOD FOR MANAGING MOBILE COMMUNICATION NETWORK USING TMN IN IMT-2000 SYSTEM

(75) Inventors: Jong-Cheol Park, Ichon-shi (KR); Ju-Hyun Ban, Ichon-shi (KR)

(73) Assignee: UTStarcom Korea Limited

(*) Notice: Subject to any disclaimer, the term of this patent is extended or adjusted under 35 U.S.C. 154(b) by 857 days.

(21) Appl. No.: 09/843,356

(22) Filed: Apr. 26, 2001

(65) Prior Publication Data
US 2002/0006779 A1  Jan. 17, 2002

(30) Foreign Application Priority Data
Apr. 26, 2000 (KR) ............................... 2000-22165

(51) Int. Cl.[7] .................. H04L 12/28; G06F 15/73; H04Q 7/20
(52) U.S. Cl. .................. 370/254; 709/223; 455/403
(58) Field of Search ................ 370/252, 328, 370/335, 342, 340

(56) References Cited

U.S. PATENT DOCUMENTS

| | | | |
|---|---|---|---|
| 5,726,979 A | 3/1998 | Henderson et al. | 370/254 |
| 6,012,152 A | 1/2000 | Douik et al. | 714/26 |
| 6,041,350 A * | 3/2000 | Takimoto | 709/223 |
| 6,058,103 A | 5/2000 | Henderson et al. | 370/254 |
| 6,094,575 A * | 7/2000 | Anderson et al. | 455/422.1 |
| 6,128,302 A * | 10/2000 | Kim et al. | 370/397 |
| 6,389,282 B1 * | 5/2002 | Hirsch | 455/423 |
| 2002/0029298 A1 * | 3/2002 | Wilson | 709/316 |

* cited by examiner

Primary Examiner—Hassan Kizou
Assistant Examiner—Hong Sol Cho
(74) Attorney, Agent, or Firm—McDonnell Boehnen Hulbert & Berghoff LLP

(57) ABSTRACT

Disclosed is an apparatus and method for managing a mobile communication network in an IMT-2000 system by means of a TMN. The apparatus and method for managing the mobile communication network in the IMT-2000 system by mean of the TMN has advantages of achieving a distensible, reusable, and optimized management with respect to MOs by managing the IMT-2000 communication network by means of the standardized management method, TMN, and further of efficiently managing the IMT-2000 communication network by applying the TMN method not only to a BSM but also to control stations.

15 Claims, 14 Drawing Sheets

FIG. 4A

| MO CLASS REUSING THE REFERENCE MANAGEMENT INFORMATION MODEL | REFERENCE STANDARD | MANAGERIAL FUNCTION AREA |
|---|---|---|
| ALARM RECORD | X.721 | FAULT |
| ATTRIBUTE VALUE CHANG RECORD | X.721 | CONFIGURATION |
| CHANNEL | TI.244 | CONFIGURATION, FAULT |
| DISCRIMINATOR | X.721 | CONFIGURATION, FAULT, PERFORMANCE (STATISTICS) |
| EQUIPMENT | M.3100 | CONFIGURATION, FAULT |
| EQUIPMENT R1 | M.3100 | CONFIGURATION, FAULT |
| EQUIPMENT HOLDER | M.3100 | CONFIGURATION, FAULT |
| EVENT FOR WARDING DISCRIMINATOR | X.721 | CONFIGURATION, FAULT, PERFORMANCE (STATISTICS) |
| HANDOVER CONTROL | TI.244 | CONFIGURATION, FAULT |
| HOMOGENEOUS SCANNER | X.721 | PERFORMANCE (STATISTICS) |

FIG. 4B

| | | |
|---|---|---|
| LOG | X.721 | CONFIGURATION, FAULT, PERFORMANCE (STATISTICS) |
| LOG RECORD | X.721 | CONFIGURATION, FAULT, PERFORMANCE (STATISTICS) |
| MANAGED ELEMENT | M.3100 | CONFIGURATION, FAULT |
| MANAGED ELEMENT COMPLEX | M.3100 | CONFIGURATION, FAULT |
| MANAGED FUNCTION | TI.244 | CONFIGURATION, FAULT |
| OBJECT CREATION RECORD | X.721 | CONFIGURATION, FAULT, PERFORMANCE (STATISTICS) |
| OBJECT DELETION RECORD | X.721 | CONFIGURATION, FAULT, PERFORMANCE (STATISTICS) |
| POWER CONTROL | TI.244 | CONFIGURATION |
| SCANNER | X.738 | SCANNER |
| SCAN REPORT RECORD | X.738 | PERFORMANCE (STATISTICS) |
| SIMPLE SCANNER | X.738 | PERFORMANCE (STATISTICS) |
| SOFTWARE | M.3100 | CONFIGURATION, FAULT, PERFORMANCE (STATISTICS) |
| STATE CHANGE RECORD | X.721 | SCANNER |
| TRANSCEIVER | TI.244 | SCANNER |

FIG. 4C

| MO | DESCRIPTION | MANAGERIAL FUNCTION AREA |
|---|---|---|
| STP EQUIPMENT | MODELING VARIOUS MANAGEMENT ASPECTS OF EQUIPMENTS | CONFIGURATION, FAULT |
| STP SIMPLE SCANNER | STATISTICS DATA COLLECTION | PERFORMANCE |
| SIP SOFTWARE | MODELING SOFTWARE MANAGEMENT ASPECTS | CONFIGURATION, FAULT |

FIG. 4D

| MO | DESCRIPTION | MANAGERIAL FUNCTION AREA |
|---|---|---|
| BSC FUNC | | CONFIGURATION, FAULT |
| BTS FUNC | | CONFIGURATION, FAULT |
| CDMA CHANNEL | | CONFIGURATION, FAULT |
| CDMA HANDOVER CONTROL | | CONFIGURATION, FAULT |
| CDMA POWER CONTROL | | CONFIGURATION, FAULT |
| CHANNEL ELEMENT | | |
| LOADING STATUS RECORD | | CONFIGURATION |
| RADIO CARRIER | | CONFIGURATION, FAULT |
| STP SIMPLE SCANNER | | |
| TRANSCODER | | CONFIGURATION, FAULT |
| BSC MSMT FUNC | | PERFORMANCE |
| BTS MSMT FUNC | | PERFORMANCE |

APPARATUS AND METHOD FOR MANAGING MOBILE COMMUNICATION NETWORK USING TMN IN IMT-2000 SYSTEM

FIELD OF THE INVENTION

The present invention generally relates to an apparatus and method for managing a mobile communication network in an IMT (international mobile telecommunication)-2000 system by means of a TMN (telecommunication management network), and in particular, to an apparatus and a method for managing a mobile communication network in an IMT-2000 system by means of a TMN, which can manage the IMT-2000 telecommunication network in a standardized manner by means of the TMN.

DESCRIPTION OF THE PRIOR ART

As well known, a TMN in a general concept is a logical structure for managing a telecommunication network and service by connecting an operation system and telecommunication network components via a reference interface through which necessary management information is interchanged, and also a substructure for systemically supporting the telecommunication management.

In the meantime, the aforementioned TMN is applicable to 25 a mobile communication network as a standardized network management method recommended by the International Telecommunication Union (ITU-T) M.3010. In this instant, the TMN defines and manages each component comprised in the mobile communication network as a Managed Object (MO) by analyzing the same in an object-oriented point of view.

Here, the MOs are abstract resources defined as attribute, behavior, management operation, notification, etc. Each resource has its attribute and transmits the notification as well as being subordinate to the management operation.

Further, the MOs are aggregated in separate groups having same characteristics, i.e., attribute, management operation, behavior, and notification. Each group of the management objects is referred to as a MO class.

On the other hand, the IMT-2000 system being rapidly developed at present has not employed the standardized TMN method to manage the IMT-2000 mobile communication network. In addition, a code division multiple access/personal communication service (CDMA/PCS) system, used prior to the IMT-2000 system, has not adopted the integrated management TMN method with respect to internal management information, even though the CDMA/PSC partially uses the TMN method in accessing network management systems of communication service providers. Furthermore, when applied to the above mentioned CDMA/PSC system, the TMN management method supports MOs which are modeled to a base station manager system (BSM) only, not to control stations and base stations.

Therefore, the IMT-2000 system of the prior art is unable to administrate MOs in a standardized and optimized manner, thereby deteriorating expansibility and reusability of the MOs later.

SUMMARY OF THE INVENTION

It is, therefore, an object of the present invention to provide an apparatus and method for managing a mobile communication network in an IMT-2000 system by means of a TMN, in which an expansible, reusable, and optimized management with respect to MOs is able to be achieved by managing the IMT-2000 communication network by means of the standardized management method, TMN.

It is another object of the present invention to provide an apparatus and a method for managing a mobile communication network in an IMT-2000 system by means of a TMN, in which the TMN method is applicable not only to a base station manager (BSM) but also to control stations.

To achieve the above objects, there is provided an apparatus for managing a mobile communication network in the IMT-2000 system by means of the TMN, which manages sub blocks within a BSM, a plurality of control stations, and a plurality of base stations in the IMT-2000 system, the apparatus includes a TMN network management center for managing a state information, i.e., configuration, fault, performance, statistics, etc., of the sub blocks within the BSM, the plurality of control stations, and the plurality of base stations by means of the TMN method, and transferring a common management information service element (CMISE) service executive instruction recommended by the International Telecommunication Union (ITU-T) to the BSM; a TMN repeater installed within the BSM and housing modeled MO classes, for collecting the state information of the sub blocks within the BSM thereof by means of the MO classes, and transferring the state information to the TMN network management center as well as updating the MO classes inside thereof so as to correspond to the CMISE service executive instruction received from the TMN network management center; a local TMN repeater installed in the plurality of control stations, and housing the modeled MO classes, for collecting the state information concerning the sub blocks within the control stations thereof by means of the MO classes and transferring the state information to the TMN network management center, while transferring the state information concerning the pertinent sub blocks transmitted from the pertinent base station among the plurality of base stations managed thereby to the TMN network management center, and then updating the MO classes inside thereof so as to correspond to the CMISE service executive instruction received from TMN repeater within the BSM; and a sub block state management section installed within each of base stations, for collecting the state information of the sub blocks within the base stations thereof and transferring the state information to the local TMN repeater within the control stations.

Also, the method for managing the mobile communication network in the IMT-2000 system by means of the TMN when the state information is generated from the sub blocks within the base stations or the control stations, the method comprises the steps of: determining, in the local TMN repeater within each of control stations, whether or not the state information, such as configuration, fault, performance, statistics, etc., is generated from the base stations managed thereby (S1-1); determining, in the local TMN repeater within each of control stations, whether or not the state information, such as configuration, fault, performance, statistics, etc., is generated from the sub blocks within the control stations thereof, if the state information, such as configuration, fault, performance, statistics, etc. is not generated from the base stations managed thereby (S1-2); transferring, in the local TMN repeater, the state information to the TMN repeater within the BSM if the state information, such as configuration, fault, performance, statistics, etc., is generated from the sub blocks within the control stations, while the S1-1 is re-proceeded with if the state information, such as configuration, fault, performance, statistics, etc., is not generated from the sub blocks within the control stations in the 51-2 (S1-3); transferring, in the TMN repeater within the BSM, the state information received from the local TMN repeater within the pertinent control station to the TMN network management center (S1-4); and managing, in the TMN network management center, the pertinent control station by means of the TMN method after receiving the state information of the sub blocks within the particular control station transmitted from the TMN repeater within the BSM (S1-5).

The method for managing the mobile communication network in the IMT-2000 system by means of the TMN when the CMISE service executive instruction is generated from the TMN network management center, the method comprises the steps of: transferring, in the TMN network management center, the CMISE service executive instruction to the TMN repeater within the BSM (S2-1); determining, in the TMN repeater within the BSM, whether or not the CMISE service executive instruction pertains thereto after receiving the CMISE service executive instruction from the TMN network management center (S2-2); transferring, in the TMN repeater within the BSM, the CMISE service executive instruction to the local TMN repeater within the pertinent control station, if the CMISE service executive instruction does not pertain thereto in the S2-2 (S2-3); determining, in the local TMN repeater within the pertinent control station, whether the CMISE service executive instruction is a state information collection command, a sub block reset command, a MO generation command, or a MO erase command after receiving the CMISE service executive instruction from the TMN repeater within the BSM (S2-4); collecting, in the local TMN repeater within the pertinent control station, the state information of the sub blocks within the pertinent control station thereof or of the sub blocks within the pertinent base station, and transferring the result to the TMN network management center, if the CMISE service executive instruction is the state information collection command in the S2-4 (S2-5); and managing, in the TMN network management center, the pertinent control station and the pertinent base station by means of the TMN method after receiving the state information of the sub blocks within the pertinent control station or of the sub blocks within the pertinent base station from the local TMN repeater within the pertinent control station (S2-6).

BRIEF DESCRIPTION OF THE DRAWINGS

The above and other objects, features and advantages of the present invention will become more apparent from the following detailed description when taken in conjunction with the accompanying drawings, in which:

FIGS. 4A and 4B is a table illustrating a set of MO classes currently reusing a TMN reference management information model among the TMN MO classes installed in the BSM and the plurality of control stations in FIG. 2;

FIG. 4C is a table illustrating a set of MO classes currently modifying the TMN reference management information model among the TMN MO classes installed in the BSM and the plurality of control stations in FIG. 2;

FIG. 4D is a table illustrating a set of MO classes newly designating the TMN reference management information model among the TMN MO classes installed in the BSM and the plurality of control stations in FIG. 2;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
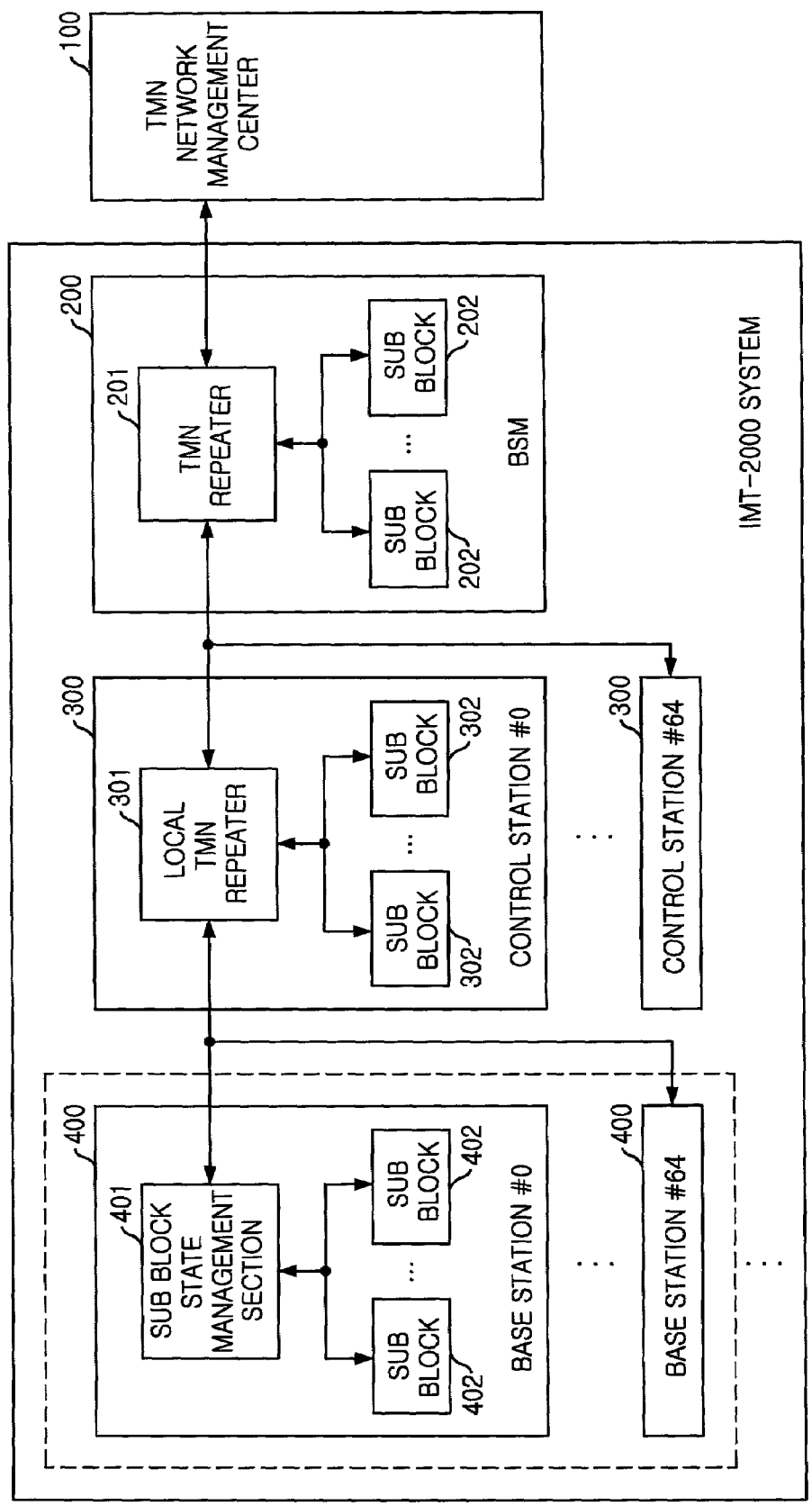
FIG. 1 is a functional block diagram illustrating a configuration of an apparatus for managing a mobile communication network in an IMT-2000 system by means of a TMN according to a preferred embodiment of the present invention.

FIG. 1 is a functional block diagram illustrating an apparatus for managing a mobile communication network in an International mobile telecommunication (IMT)-2000 system by means of a telecommunication management network (TMN) according to a preferred embodiment of the present invention. The apparatus for managing the mobile communication network in the IMT-2000 system by means of the TMN comprises a TMN network management center 100, a TMN repeater 201 installed within a base station manager (BSM) 200, a local TMN repeater 301 installed within each of control stations 300, and a sub block state management section 401 installed within each of base stations 400.

The TMN network management center 100 manages a state information, i.e., configuration, fault, performance, statistics, etc., of sub blocks 202, 302, 402 installed within the BSM 200, the plurality of control stations 300, 10 the plurality of base stations 400 by means of the TMN method, and simultaneously transfers a common management information service element (CMISE) service executive instruction, viz, sub block state information collection command, sub block reset command, MO generation command and MO erase command, recommended by the International Telecommunication Union (ITU-T), to the TMN repeater 201 within the BSM 200.

Figure 2:
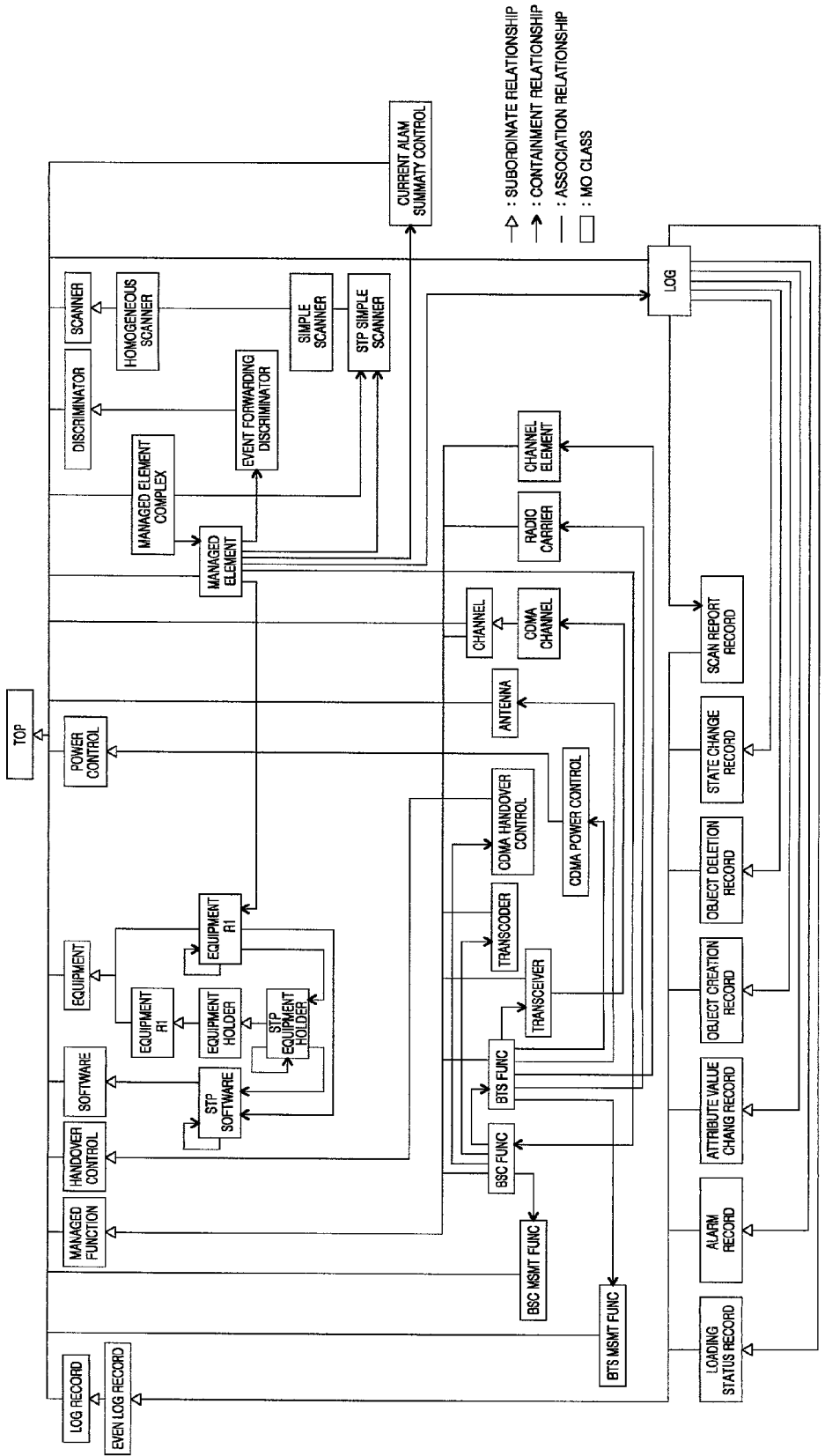
FIG. 2 is a diagram illustrating a modeling process of TMN MO classes installed within a BSM and a plurality of control stations in the apparatus for managing the mobile communication network in the IMT-2000 system by means of the TMN in FIG. 1.

The TMN repeater 201 installed within the BSM 200 and housing modeled MO classes as shown in FIG. 2 collects the state information of the respective sub blocks 202 within the BSM thereof by means of the MO classes and transfers the state information to the TMN network management center 100, while performing the MO class updating operation, i.e., sub block state information collection, sub block reset, MO generation, and MO erase, upon receiving the CMISE service executive instruction from the TMN network management center 100.

The local TMN repeater 301 installed within each of control stations 300, and housing the modeled MO classes as shown in FIG. 2 collects the respective sub blocks 302 within the control stations 300 thereof by means of the MO classes and transfers the state information to the TMN network management center 100, whereas transferring the state information of the pertinent sub blocks 402 received from the pertinent base station 400 among the plurality of base stations 400 to the TMN network management center 100, and then performing the MO class updating operation, i.e., sub block state information collection, sub block reset, MO generation and MO erase so as to correspond to the CMISE service executive instruction received from the TMN repeater 201 within the BSM 200.

The sub block state management section 401 installed within each of base stations 400, collects the state information of the sub blocks 402 inside thereof and transfers the state information to the local TMN repeater 301 within the control stations 300.

It will be explained hereinafter the method for managing the mobile communication network by using the apparatus having the earlier mentioned configuration for managing the mobile communication network in the IMT-2000 system by means of the TMN according to the preferred embodiment of the present invention.

First, the modeling process concerning the TMN MO classes installed within the local TMN repeater 301 and the TMN repeater 201 will be described herein below with reference to FIG. 2, and FIG. 3. The TMN MO class model drawn in FIG. 2 is an illustration modeled in order to manage the IMT-2000 mobile communication network by means of the TMN by HYNDAI ELECTRONICS IND., CO., LTD.

Initially, an operator collects various types of management resources within the BSM 200, the plurality of control stations 300 and the plurality of base stations in the IMT-2000 mobile communication network, and defines the MOs by referencing them to a reference management information model currently supported by the TMN.

Figure 3:
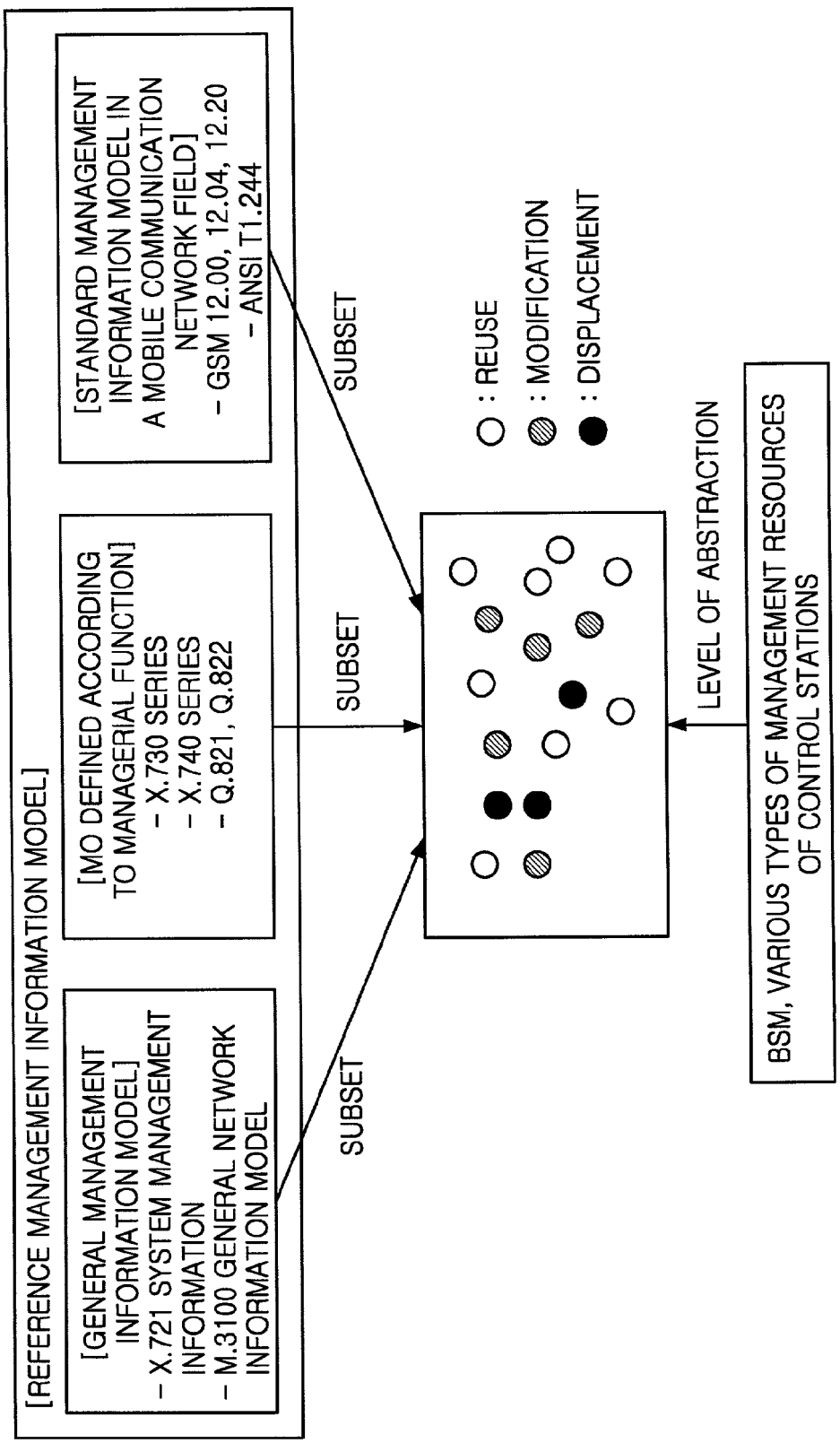
FIG. 3 is a conceptual diagram illustrating a modeling process of the TMN MO classes installed within the BSM and the plurality of control stations in FIG. 2.

Here, the reference management information model currently supported by the TMN, as shown in FIG. 3, includes a MO class recommended by the general management models X.721, and M.3100, a MO class recommended by the MO models defined according to a managerial function, X.730, X.740, Q.821, and Q.822, and a MO class recommended by the management information models in a mobile communication field, GSM 12.00, 12.04, 12.20, and ANSI T1,244.

Thereafter, the operator determines, as shown in FIG. 3, whether the various types of management resources within the BSM 200, the plurality of control stations 300, and the plurality of base stations 400 in the IMT-2000 system should be used by directly referencing to and reusing the reference management information model currently supported by the TMN, or by modifying the reference management information model, or by newly defining the reference management information model, and then performs the modeling for the TMN MOs depending on the determination. The MO classes as drawn in FIG. 2 are accordingly modeled.

Just for your information, among the TMN MO class models in FIG. 2, the MO classes reusing the reference management information model currently supported by the TMN is like in FIGS. 4A and B, the MO classes modifying the reference management information model currently supported by the TMN is like in FIG. 4C, and the MO classes newly defining the reference management information model currently supported by the TMN is like in FIG. 4D.

A process of managing the mobile communication network in the IMT-2000 system by means of the TMN when the state information is generated from the sub blocks within the base stations or the control stations according to the preferred embodiment of the present invention will be described herein below with reference to FIG. 5.

Figure 5:
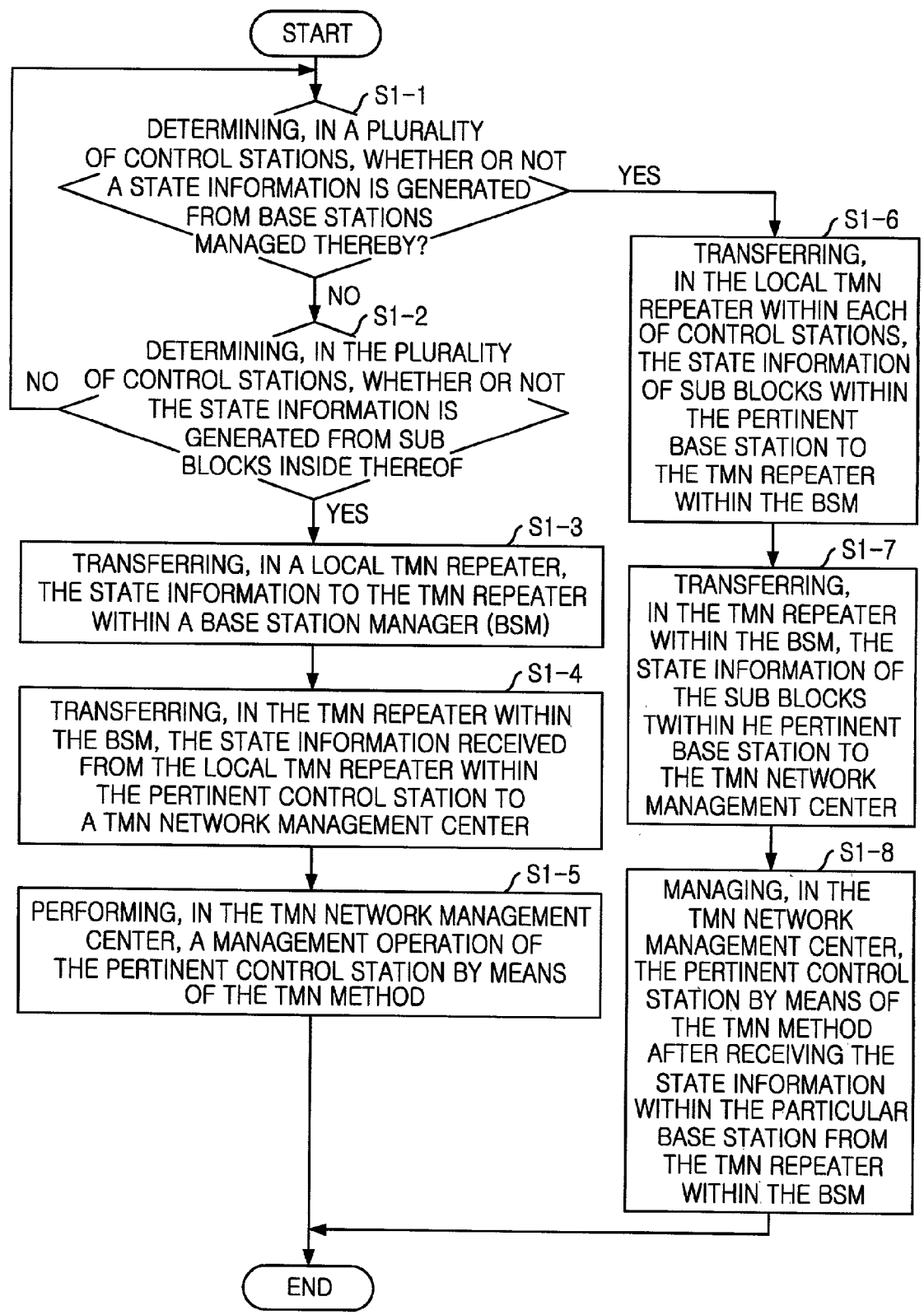
FIG. 5 is a flow chart illustrating a process of managing the mobile communication network by means of the TMN when a state information is generated from sub blocks within base stations or the control stations according to the preferred embodiment of the present invention.

FIG. 5 is a flow chart illustrating the process of managing the mobile communication network in the IMT-2000 system by means of the TMN when the state information is generated from the sub blocks within the base stations or the control stations according to the preferred embodiment of the present invention.

If the state information, i.e., configuration, fault, 15 performance, statistic, etc., does not is generated from the sub blocks 302 within the control stations 300 in the S1-2, the S1-1 is re-proceeded with. Alternatively, if the state information, i.e., configuration, fault, performance, statistic, etc., is generated from the sub blocks 302 within 20 the control stations 300, the local TMN repeater 301 transfers the state information to the TMN repeater 201 within the base station manager (BSM) 200 (S1-3).

If the state information, i.e., configuration, fault, performance, statistics, etc., is not generated from the plurality of base stations 400 managed thereby in the S1-1, the local TMN repeater 301 within each of control stations 5 300 determines whether or not the state information, i.e., configuration, fault, performance, statistics, etc., is generated from the sub blocks 302 within the control stations 300 thereof (S1-2). Here, the local TMN repeater 301 within each of control stations 300 uses the pertinent TMN MO 10 classes as shown in FIG. 2 to grasp the state information concerning the sub blocks 302 inside thereof, and then transfers the TMN MO classes to a TOP MO to collect the state information as to the plurality of sub blocks 302.

If the state information, i.e., configuration, fault, performance, statistics, etc., does not is generated from the sub blocks 302 within the control stations 300 in the S1-2, the S1-1 is re-proceeded with. Alternatively, if the state information, i.e., configuration, fault, performance, statistics, etc., is generated from the sub blocks 302 within the control stations 300, the local TMN repeater 302 transfers the state information to the TMN repeater 201 within the base station manager (BSM) 200 (S1-3).

Next, the TMN repeater 201 within the BSM 200 transfers the state information received from the local TMN repeater 301 within the pertinent control station 300 to the TMN network management center 100 (S1-4).

Then, the TMN network management center 100 manages the pertinent control station 300 by means of the TMN method upon receiving the state information concerning the sub blocks 302 within the particular control station 300 transmitted from the TMN repeater 201 within the BSM 200 (S1-5).

In the meanwhile, if the state information, i.e., configuration, fault, performance, statistics, etc., is generated from the plurality of base stations 400 managed thereby in the S1-1, the local TMN repeater 301 within each of control stations 300 transfers the state information as to the sub blocks within the particular base station 400 to the TMN repeater 201 within the BSM 200 (S1-6).

Thereafter, the TMN repeater 201 within the BSM 200 transfers the state information as to the sub blocks 402 within the particular base station 400 received from the local TMN repeater 301 within each of control stations 300 to the TMN network management center 100 (S1-7).

Thereafter, the TMN network management center 100 manages the pertinent control station 300 by means of the TMN method upon receiving the state information within the particular base station 400 from the TMN repeater 201 within the BSM 200 (S1-8).

In the meantime, a process of managing the mobile communication network in the IMT-2000 system by means of the TMN when the CMISE service executive instruction is generated from the TMN network management center according to the preferred embodiment of the present invention will be described herein below with reference to FIG. 6.

Figure 6A:
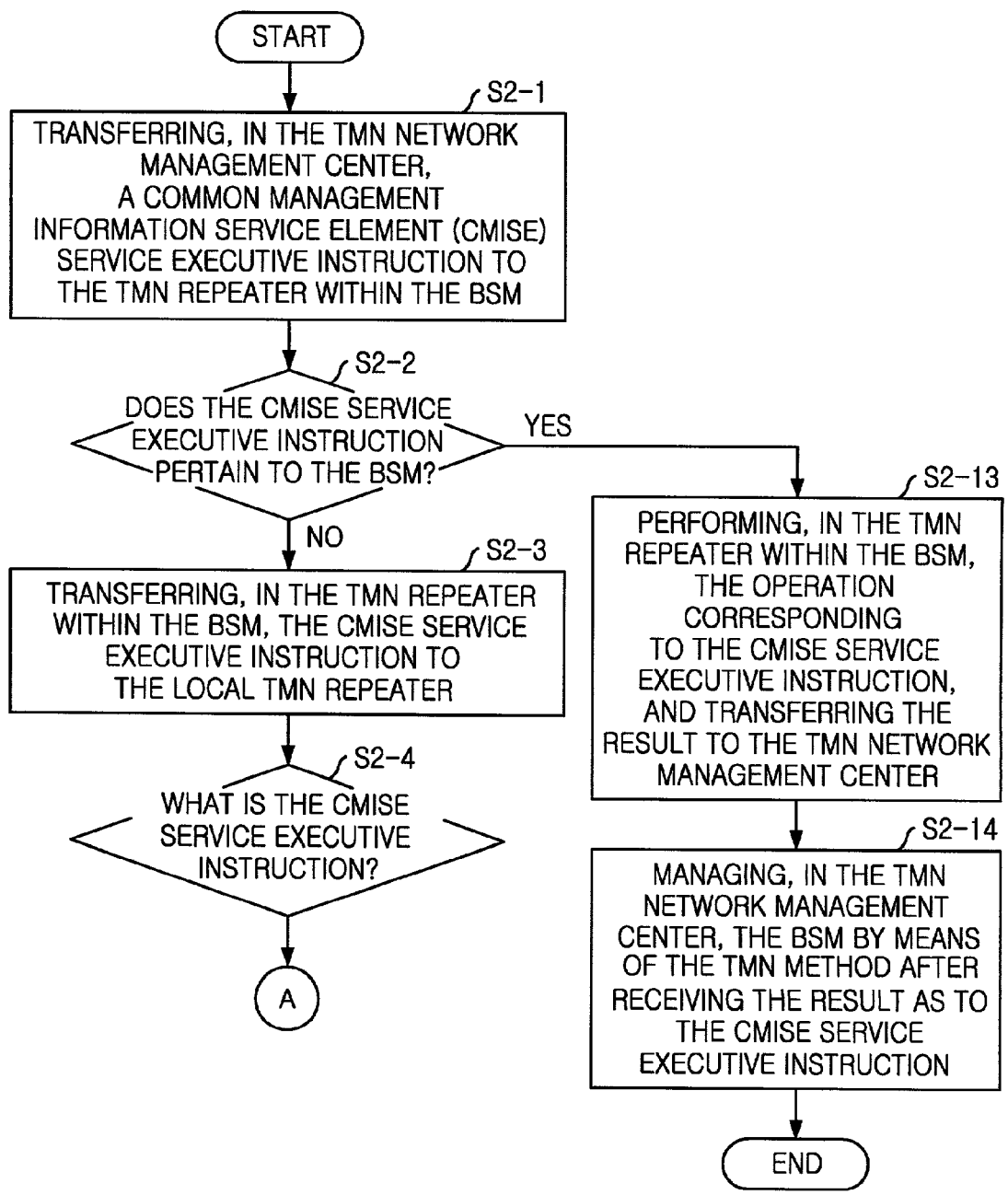
FIG. 6 is a flow chart illustrating a process of managing the mobile communication network by means of the TMN when a common management information service element (CMISE) service executive instruction is generated from a TMN network management center according to the preferred embodiment of the present invention.
Figure 6B:
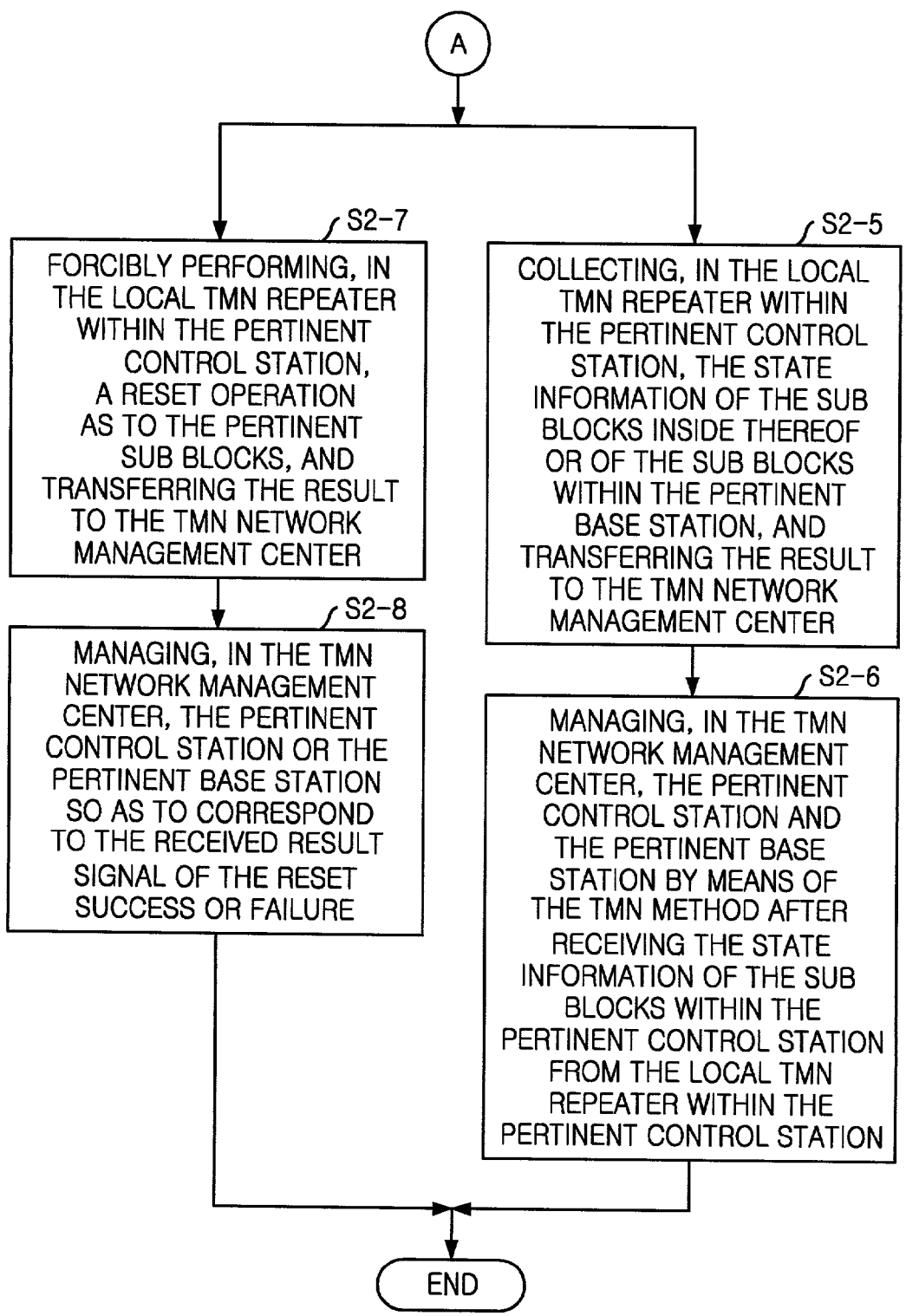
Figure 6C:
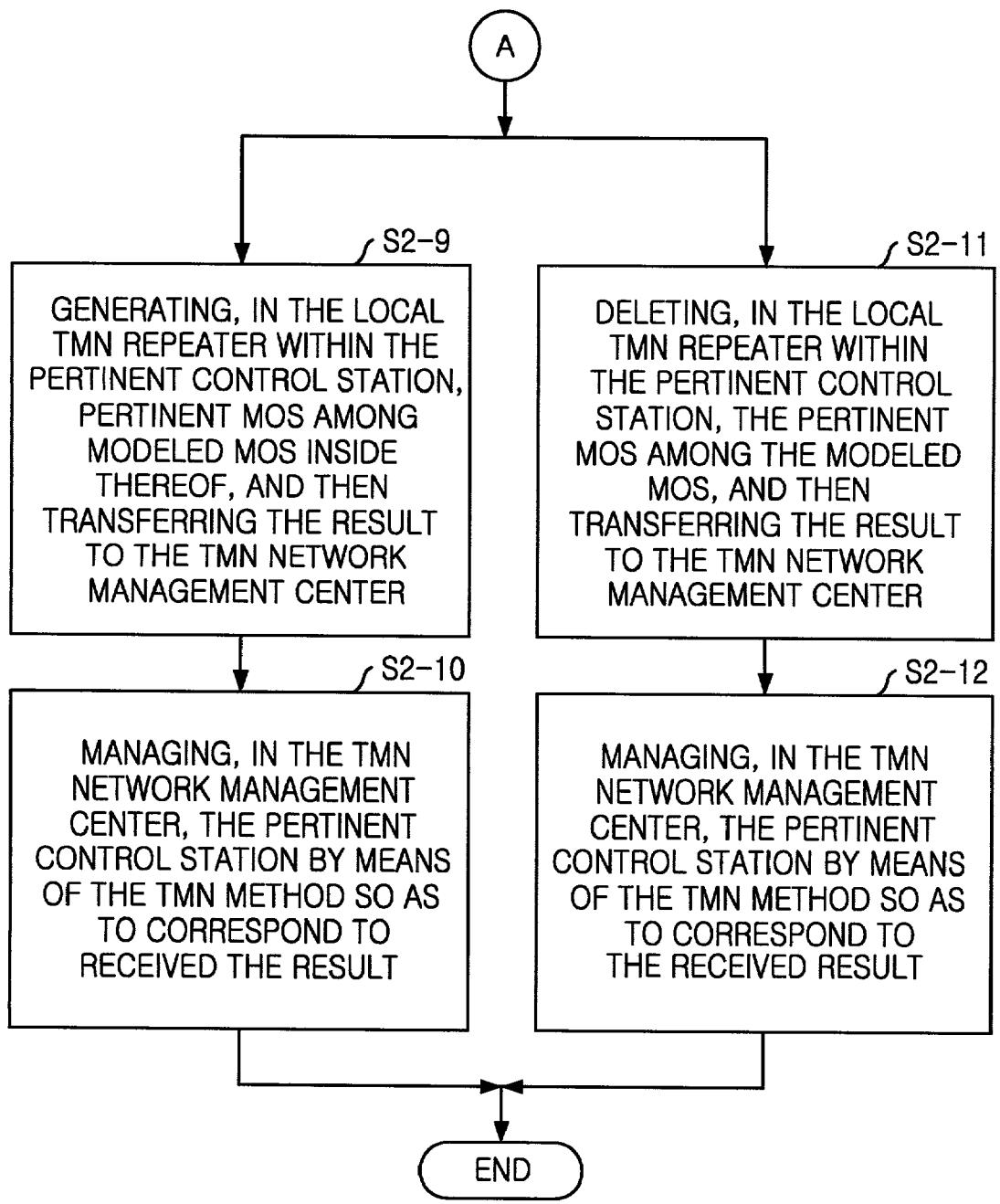

FIG. 6 is a flow chart illustrating the process of managing the mobile communication network in the IMT-2000 system by means of the TMN when the CMISE service executive instruction is generated from the TMN network management center according to the preferred embodiment of the present invention.

First, the TMN network management center 100 transfers the CMISE service executive instruction to the TMN repeater 201 within the BSM 200 (S2-1).

Then, the TMN repeater 201 within the BSM 200 determines whether the CMISE service executive instruction received from the TMN network management center 100 pertains thereto or to the control stations 300 (S2-2).

Here, if the CMISE service executive instruction does not pertain to the TMN repeater 201, the TMN repeater 201 within the BSM 200 transfers the CMISE service executive instruction to the local TMN repeater 301 within the pertinent control station 300 (S2-3).

Then, the local TMN repeater 301 within the pertinent control station 300 determines whether the CMISE service executive instruction received from the TMN repeater 201 within the BSM 200 is the state information collection command, the sub block reset command, the MO generation command, or the MO erase command (S2-4).

If the CMISE service executive instruction is the state information collection command in the S2-4, the local TMN repeater 301 within the pertinent control station 300 performs the state information collection operation as to the sub blocks 302 within the pertinent control station 300 thereof or as to the sub blocks within the pertinent base station 400, and then transfers the result to the TMN network management center 100 (S2-5).

Figure 7:
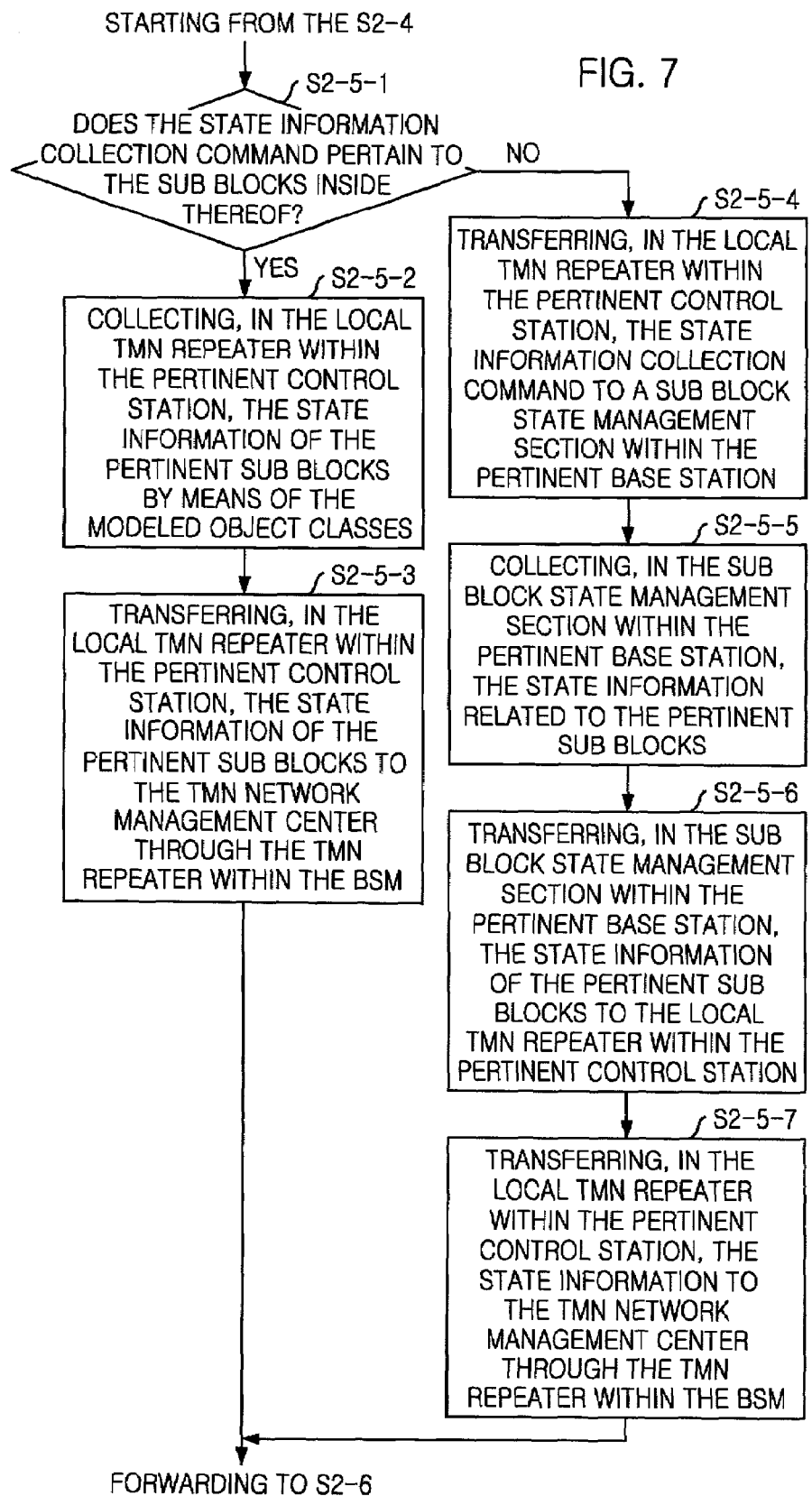
FIG. 7 is a flow chart illustrating a detailed operation of the S2-5 in the process of managing the mobile communication network by means of the TMN when the CMISE service executive instruction is generated from the TMN network management center in FIG. 6.

A detailed operation of the S2-5 will be described herein below with reference to FIG. 7.

Initially, the local TMN repeater 301 within the pertinent control station 300 determines whether the state information collection command pertains to the sub blocks 302 inside thereof or to the sub blocks 402 within the base stations managed thereby (S2-5-1).

If the state information command pertains to the sub blocks 302 within the control stations 300 thereof in the S2-5-1, the local TMN repeater 301 within the pertinent control station 300 collects the state information of the sub blocks 302 by means of the MO classes drawn in FIG. 2 (S2-5-2).

Thereafter, the local TMN repeater 301 within the pertinent control station 300 transfers the state information of the pertinent sub blocks 302 to the TMN network management center 100 through the TMN repeater 201 within the BSM 200 (S2-5-3).

On the other hand, if the state information collection command pertains to the sub blocks 402 within the pertinent base station 400 managed thereby, the local TMN repeater 301 within the pertinent control station 300 transfers the state information collection command to the sub block state management section 401 within the pertinent base station 400 (S2-5-4).

Next, the sub block state management section 401 within the pertinent base station 400 collects the state information related to the pertinent sub blocks 402 upon receiving the state information collection command from the local TMN repeater 301 within the pertinent control station 300 (S2-5-5).

Thereafter, the sub block state management section 401 within the pertinent base station 400 transfers the state information of the pertinent sub blocks 402 to the local TMN repeater 301 within the control stations 300 (S2-5-6).

Thereafter, the local TMN repeater 301 within the pertinent control station 300 transfers the state information to the TMN network management center 100 through the TMN repeater 201 within the BSM 200 upon receiving the state information with respect to the sub blocks 402 within the pertinent base station 400 from the sub block state management section 401 within the pertinent base station 400 (S2-5-7).

Further, the TMN network management center 100 manages the pertinent control station 300 and the pertinent base station 400 by means of the TMN method upon receiving the state information concerning the sub blocks 302 within the pertinent control station 300 or the sub blocks 402 within the pertinent base station 400 from the local TMN repeater 301 within the pertinent control station 300 (S2-6).

In the meantime, if the CMISE service executive instruction is the sub block reset command in the S2-4, the local TMN repeater 301 within the pertinent control station 300 forcibly performs the reset operation as to the pertinent sub blocks 302 within the control stations 300 thereof or the sub blocks 402 within the pertinent base station 400, and then transfers the result of the success or failure to the TMN network management center 100 (S2-7).

Figure 8:
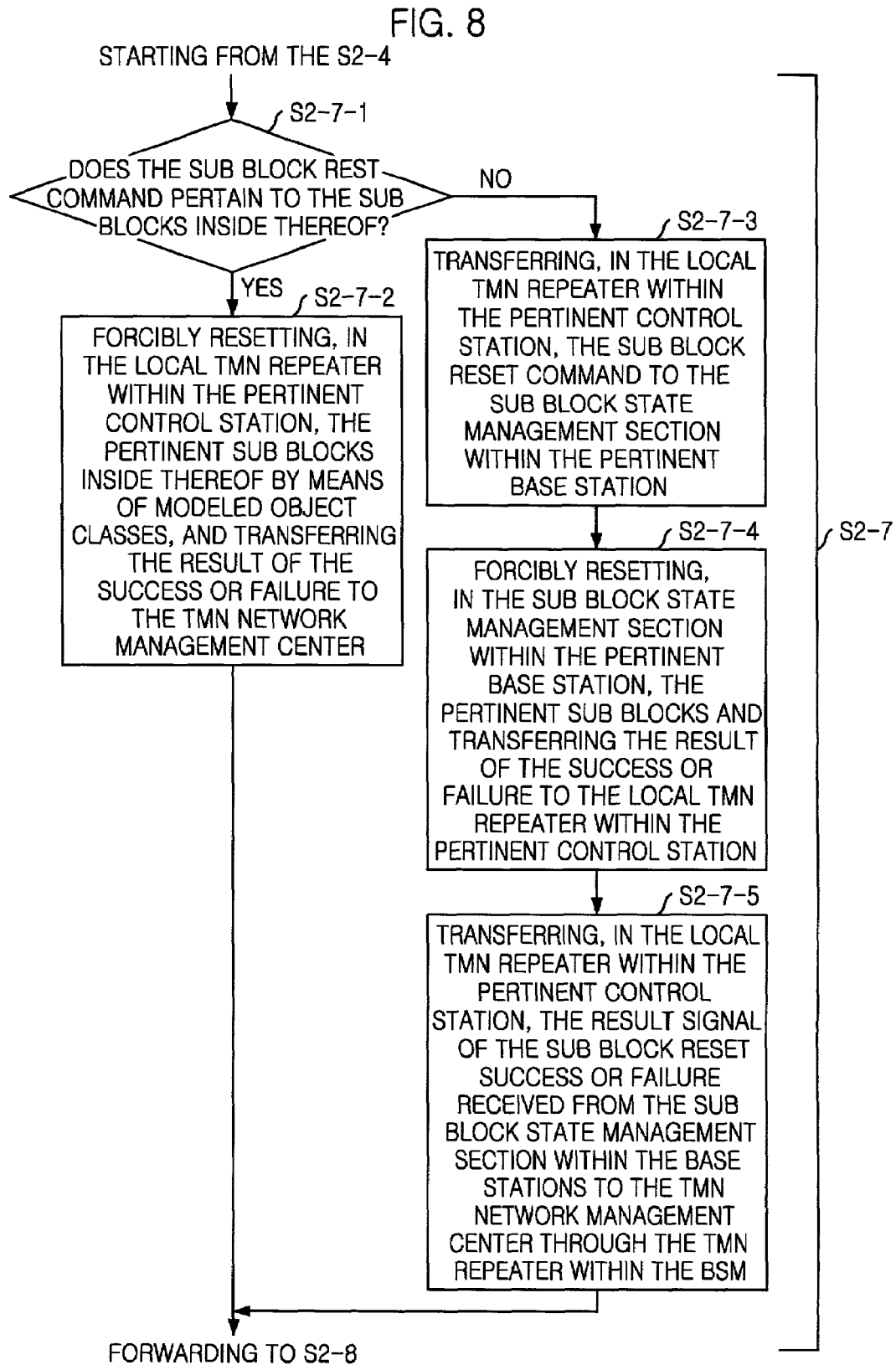
FIG. 8 is a flow chart illustrating a detailed operation of the S2-7 in the process of managing the mobile communication network by means of the TMN when the CMISE service executive instruction is generated from the TMN network management center in FIG. 6.

A detailed operation of the S2-7 will be described herein below with reference to FIG. 8.

Initially, the local TMN repeater 301 within the pertinent control station 300 determines whether the sub block reset command pertains to the sub blocks 302 within the control stations 300 thereof or the sub blocks 402 within the base stations 400 managed thereby (S2-7-1).

Here, if the sub block reset command pertains to the sub blocks 302 within the control stations 300 thereof in the S2-7-1, the local TMN repeater 301 within the pertinent control station 300 forcibly resets the pertinent sub blocks 302 by means of the MO classes drawn in FIG. 2, and transfers the result of the success or failure to the TMN network management center 100 (S2-7-2).

On the other side, if the sub block reset command pertains to the sub blocks 402 within the pertinent base station 400 managed by the local TMN repeater 301 in the S2-7-1, the local TMN repeater 301 within the pertinent control station 300 transfers the sub block reset command to the sub block state management section 401 within the pertinent base station 400 (S2-7-3).

Then, the sub block state management section 401 within the pertinent base station 400 forcibly resets the pertinent sub blocks 402 and transfers the result of the success or failure to the local TMN repeater 301 within the pertinent control station 300 upon receiving the sub block reset command from the local TMN repeater 301 within the pertinent control station 300 (S2-7-4).

Further, the local TMN repeater 301 within the pertinent control station 300 transfers the result signal of the reset success or failure received from the sub block state management section 401 within the base stations 400 to the TMN network management center 100 through the TMN repeater 201 within the BSM 200 (S2-7-5).

Furthermore, the TMN network management center 100 manages the pertinent control station 300 or the pertinent base station 400 by means of the TMN method, so as to correspond to the result signal of the reset success or failure regarding to the sub blocks 302 within the pertinent control station 300 or the sub blocks 402 within the pertinent base station 400 received from the local TMN repeater 301 within the pertinent control station 300 (S2-8).

If the CMISE service executive instruction, on the other hand, is the MO generation command in the S2-4, the local TMN repeater 301 within the pertinent control station 300 is generated the pertinent MOs among the modeled MOs inside thereof, and then transfers the result signal of the success or failure to the TMN network management center 100 through the TMN repeater 201 within the BSM 200 (S2-9).

Further, the TMN network management center 100 manages the pertinent control station 300 by means of the TMN method, so as to correspond to the result signal of the success or failure regarding the MO generation received from the local TMN repeater 301 within the pertinent control station 300 (S2-10).

If the CMISE service executive instruction is the MO erase command in the S2-4, the local TMN repeater 301 within the pertinent control station 300 deletes the pertinent MOs among the modeled MOs inside thereof, and then transfers the result indicating the success or failure to the TMN network management center 100 through the TMN repeater 201 within the BSM 200 (S2-11).

Thereafter, the TMN network management center 100 manages the pertinent control station 300 by means of the TMN method so as to correspond to the result signal regarding the MO erase received from the local TMN repeater within the pertinent control station 300 (S2-12).

Further, if the CMISE service executive instruction pertains to the BSM 200 in the S2-2, the TMN repeater 201 within the BSM performs the sub block state information collection, the sub block reset, the MO generation or the MO erase, so as to correspond to the CIMISE service executive instruction, and then transfers the result to the TMN network management center 100 (S2-13).

Figure 9:
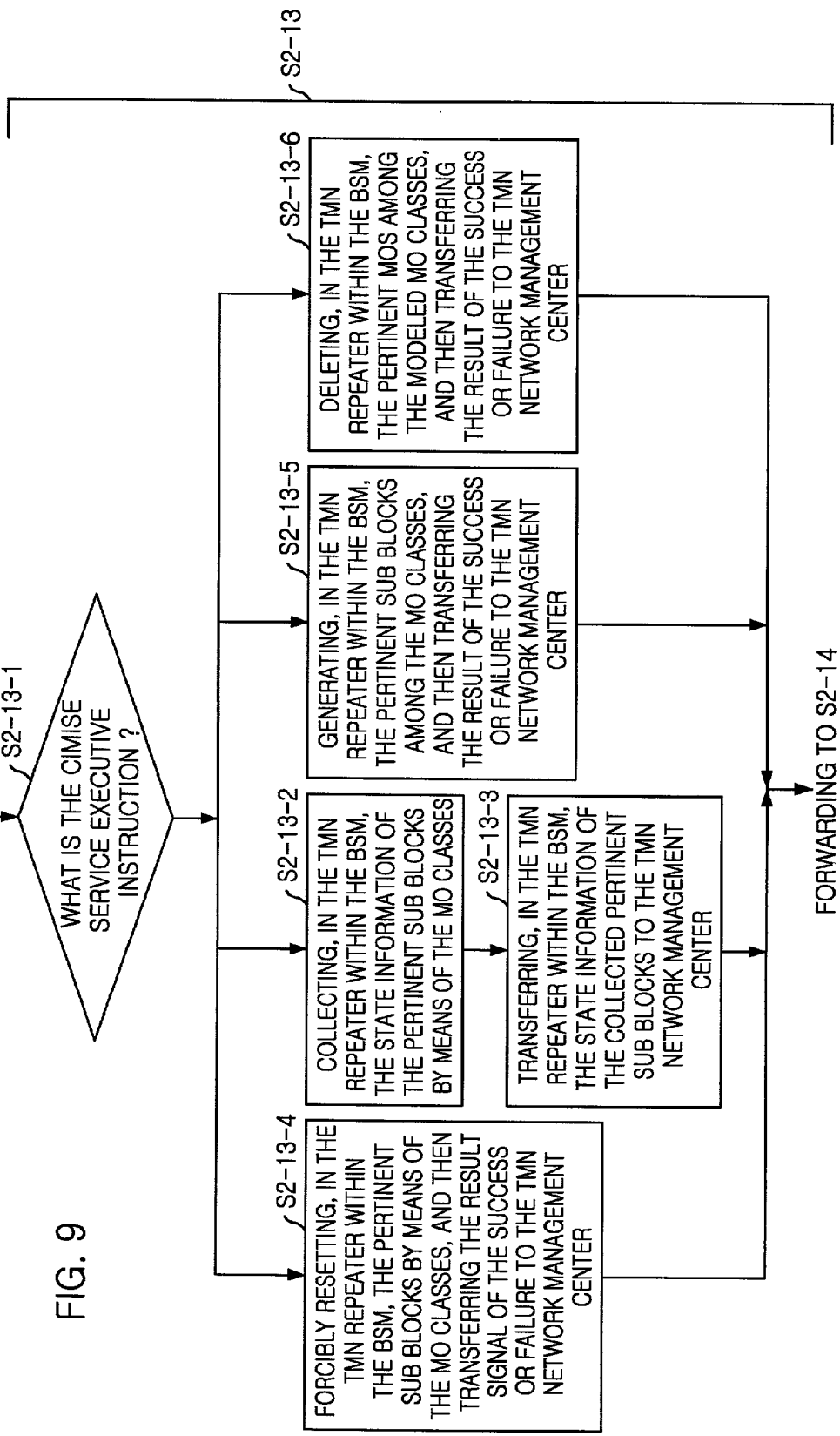
FIG. 9 is a flow chart illustrating a detailed operation of the S2-13 in the process of managing the mobile communication network by means of the TMN when the CMISE service executive instruction is generated from the TMN network management center in FIG. 6.

A detailed operation of the S2-13 will be described herein below with reference to FIG. 9.

First, the TMN repeater 201 within the BSM 200 determines whether the CMISE service executive instruction is the state information collection command, the sub block reset command, the MO generation command, or the MO erase command (S2-13-1).

Here, if the CMISE service executive instruction is the state information collection command in the S2-13-1, the TMN repeater 201 within the BSM 200 collects the state information of the pertinent sub blocks 202 by means of the MO classes drawn in FIG. 2 (S2-13-2).

After that, the TMN repeater 201 within the BSM 200 transfers the state information of the collected pertinent sub blocks 202 to the TMN network management center 100 (S2-13-3).

In the meantime, if the CMISE service executive instruction is the sub block reset command in the S2-13-2, the TMN repeater 201 within the BSM 200 forcibly resets the pertinent sub blocks 202 by means of the MO classes drawn in FIG. 2, and then transfers the result signal of the success or failure to the TMN network management center 100 (S2-13-4).

On the other side, if the CMISE service executive instruction is the MO generation command in the S2-13-2, the TMN repeater 201 within the BSM 200 is generated the pertinent sub blocks 202 among the MO classes drawn in the FIG. 2, and then transfers the result of the success or failure to the TMN network management center 100 (S2-13-5).

Further, if the CMISE service executive instruction is the MO erase command in the S2-13-2, the TMN repeater 201 within the BSM 200 deletes the pertinent sub blocks 202 among the MO classes drawn in FIG. 2, and then transfers the result of the success or failure to the TMN network management center 100 (S2-13-6).

Then, the TMN network management center 100 manages the BSM 200 by means of the TMN method, so as to correspond to the result signal with regard to the sub block state information collection operation, the sub block reset operation, the MO generation operation, or the MO erase operation received from the TMN repeater 201 within the BSM 200 (S2-14).

As above stated, the apparatus and the method for managing the mobile communication network in the IMT-2000 system by means of the TMN according to the present invention, have advantages of enhancing expansibility and reusability of the MOs, and achieving the optimization of the system management since the IMT-2000 communication network can be managed in the standardized manner by means of the TMN method, and of efficiently managing the IMT-2000 communication network since the TMN method pertains not only to the BSM but also to the control stations.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for managing MO sub blocks within any of a base station manager (BSM), a plurality of control stations, and a plurality of base stations in an IMT-2000 system, the apparatus comprising:

a TMN network management center for (i) managing state information of the sub blocks and for (ii) transferring a common management information service element (CMISE) service executive instruction to the BSM;

a TMN repeater installed within the BSM and including modeled MO classes, for (i) collecting the state information concerning sub blocks within the BSM by means of the MO classes to transfer the state information to the TMN network management center, for (ii) updating the MO classes inside thereof to correspond to a CMISE service executive instruction received from the TMN network management center;

a local TMN repeater installed within each control station, and housing the modeled MO classes, wherein said local TML repeater (i) collects the state information of sub blocks within the control stations, and (ii) updates the MO classes inside thereof to correspond to the CMISE service executive instruction received from said TMN repeater within the BSM; and a sub block state management section installed within each base station, for (i) collecting the state information of the sub blocks inside thereof and for (ii) transferring the state information to the local TMN repeater within the control stations.

2. A method for managing a mobile communication network in an IMT-2000 system by means of a TMN when a state information is generated from sub blocks within base stations or control stations, the method comprising the steps of:

a1) determining, in a local TMN repeater within each control stations, whether or not the state information, is generated from base stations managed thereby;

b1) determining, in the local TMN repeater within each of control stations, whether or not the state information, is generated from sub blocks within the control station thereof, when the state information is not generated from the base stations managed thereby;

c1) transferring, in the local TMN repeater, the state information to a TMN repeater within a BSM when the state information is generated from the sub blocks within the control station, and proceeding to the step a1) when the state information is generated from the sub blocks within the control station in the a1) step;

d1) transferring, in the TMN repeater within the BSM, the state information received from the local TMN repeater within the pertinent control station to a TMN network management center; and e1) managing, in the TMN network management center, the pertinent control station by means of the TMN method upon receiving the state information of the sub blocks within the particular control station transmitted from the TMN repeater within the BSM.

3. The method as recited in claim 2, further comprising the steps of:

f1) transferring, in the local TMN repeater within each of control stations, the state information of the sub blocks within the particular base station to the TMN repeater within the BSM, when the state information is generated from the base stations managed thereby in the step a1);

g1) transferring, in the TMN repeater within the BSM, the state information of the sub blocks within the particular base station received from the local TMN repeater within each of control stations to the TMN network management center; and h1) managing, in the TMN network management center, the pertinent control station by means of the TMN method upon receiving the state information within the particular base station from the TMN repeater within the BSM.

4. A method for managing a mobile communication network in an IMT-2000 system by means of a TMN, the method comprising the steps of:

a2) transferring, in a TMN network management center, a CMISE service executive instruction to a TMN repeater within a BSM;

b2) determining, in the TMN repeater within the BSM, whether or not the CMISE service executive instruction pertains thereto upon receiving the CMISE service executive instruction from the TMN network management center;

c2) transferring, in the TMN repeater within the BSM, the CMISE service executive instruction to a local TMN repeater within a pertinent control station, when the CMISE service executive instruction does not pertain thereto in the step b2);

d2) determining, in the local TMN repeater within the pertinent control station, whether the CMISE service executive instruction is a state information collection command, a sub block reset command, a MO generation command, or a MO erase command upon receiving the CMISE service executive instruction from the TMN repeater within the BSM;

e2) collecting, in the local TMN repeater within the pertinent control station, the state information of sub blocks within the pertinent control station thereof or within a pertinent base station, and transferring the result to the TMN network management center, if the CMISE service executive instruction is the state information collection command in the step d2) ; and f2) managing, in the TMN network management center, the pertinent control station and the pertinent base station by means of the TMN method upon receiving the state information of the sub blocks within the pertinent control station or within the pertinent base station from the local TMN repeater within the pertinent control station.

5. The method as recited in claim 4, wherein collecting and transferring of the step e2) comprises:

a3) determining, in the local TMN repeater within the pertinent control station, whether the state information collection command pertains to the sub blocks within the control stations thereof or to the sub blocks within the base stations managed thereby;

b3) collecting, in the local TMN repeater within the pertinent control station, the state information of the sub blocks by means of MO classes, when the state information collection command pertains to the sub blocks thereof in the step a3); and c3) transferring, in the local TMN repeater within the pertinent control station, the state information of the pertinent sub blocks to the TMN network management center through the TMN repeater within the BSM.

6. The method as recited in claim 5, further comprising the steps of:

d3) transferring, in the local TMN repeater within the pertinent control station, the state information collection command to a sub block state management section within the pertinent base station, when the state information collection command pertains to the sub blocks of the pertinent base station managed thereby in the step a3);

e3) collecting, in the sub block state management section within the pertinent base station, the state information related to the pertinent sub blocks upon receiving the state information collection command transmitted from the local TMN repeater within the pertinent control station;

f3) transferring, in the sub block state management section within the pertinent base station, the state information of the pertinent sub blocks to the local TMN repeater within the control stations; and g3) transferring, in the local TMN repeater within the pertinent control station, the state information to the TMN network management center through the TMN repeater within the BSM upon receiving the state information of the sub blocks within the pertinent base station transmitted from the sub block state management section within the pertinent base station.

7. The method as recited in claim 4, further comprising the steps of:

g2) forcibly resetting, in the local TMN repeater within the pertinent control station, the pertinent sub blocks thereof or the sub blocks within the pertinent base station, and transferring a result signal of the resetting to the TMN network management center, when the CMISE service executive instruction is the sub block reset command in the step d2); and h2) managing, in the TMN network management center, the pertinent control station or the pertinent base station so as to correspond to the result signal of the success or failure of the sub blocks within the pertinent control station or the pertinent base station received from the local TMN repeater within the pertinent control station.

8. The method as recited in claim 7, wherein said resetting and transferring of the step g2) comprises:

a4) determining, in the local TMN repeater within the pertinent control station, whether the sub block reset command pertains to the sub blocks thereof or to the sub blocks within the base stations managed thereby; and b4) forcibly resetting, in the local TMN repeater within the pertinent control station, the pertinent sub blocks thereof by means of modeled object classes, and transferring the result of the resetting to the TMN network management center, when the sub block reset command pertains to the sub blocks thereof in the step a4).

9. The method as recited in claim 8, further comprising the steps of:

c3) transferring, in the local TMN repeater within the pertinent control station, the sub block reset command to the sub block state management section within the pertinent base station, when the sub block reset command pertains to the sub blocks within the pertinent base station managed thereby in the step a4);

d4) forcibly resetting, in the sub block state management section within the pertinent base station, the pertinent sub blocks and transferring a result signal of the resetting to the local TMN repeater within the pertinent control station upon receiving the sub block reset command from the local TMN repeater within the pertinent control station; and e4) transferring, in the local TMN repeater within the pertinent control station, the result signal of the resetting received from the sub block state management section within the base stations to the TMN network management center through the TMN repeater within the BSM.

10. The method as recited in claim 4, further comprising the steps of:

i2) generating, in the local TMN repeater within the pertinent control station, pertinent MOs among the modeled MOs thereof, and transferring a result signal of the generating to the TMN network management center through the TMN repeater within the BSM, when the CMISE service executive instruction is the MO generation command in the step d2); and j2) managing, in the TMN network management center, the pertinent control station by means of the TMN method so as to correspond to the result signal of the generating received from the local TMN repeater within the pertinent control station.

11. The method as recited in claim 4, further comprising the steps of:

k2) erasing, in the local TMN repeater within the pertinent control station, the pertinent MOs among the modeled MOs inside thereof, and transferring a result signal of the erasing to the TMN network management center through the TMN repeater within the BSM, when the CMISE service executive instruction is the MO erase command in the step d2); and l2) managing, in the TMN network management center, the pertinent control station by means of the TMN method to correspond to the result signal of the erasing received from the local TMN repeater within the pertinent control station.

12. The method as recited in claim 4, further comprising the steps of:

m2) performing, in the TMN repeater within the BSM, at least one of sub block state information collection, sub block reset, MO generation or the MO erase to correspond to the CIMISE service executive instruction, and then transferring the result value to the TMN network management center, when the CMISE service executive instruction pertains to the BSM in the step b2); and n2) managing, in the TMN network management center, the BSM by means of the TMN method to correspond to the result signal received from the TMN repeater within the BSM.

13. The method as recited in claim 12, wherein the step m2) comprises:

m-1) determining, in the TMN repeater within the BSM, whether the CMISE service executive instruction is the state information collection command, the sub block reset command, the MO generation command, or the MO erase command;

m-2) collecting, in the TMN repeater within the BSM, the state information of the pertinent sub blocks by means of the MO classes, when the CMISE service executive instruction is the state information collection command in the step m-1); and m-3) transferring, in the TIVIN repeater within the BSM, the collected state information of the pertinent sub blocks to the TMN network management center.

14. The method as recited in claim 13, further comprising the step of: forcibly resetting, in the TMN repeater within the BSM, the pertinent sub blocks by means of the MO classes and transferring a result signal of the resetting to the TMN network management center, when the CMISE service executive instruction is the sub block reset command in the step m-2).

15. The method as recited in claim 13, further comprising the step of: generating, in the TMN repeater within the BSM, the pertinent sub blocks among the MO classes and transferring a result signal of the generating to the TMN network management center.

* * * * *